United States Patent [19]

Suganuma

[11] Patent Number: 5,625,263
[45] Date of Patent: Apr. 29, 1997

[54] DRIVING DEVICE FOR ULTRASONIC WAVE MOTOR

[75] Inventor: Ryoichi Suganuma, Yokohama, Japan

[73] Assignee: Nikon Corporation, Tokyo, Japan

[21] Appl. No.: 396,324

[22] Filed: Feb. 28, 1995

Related U.S. Application Data

[63] Continuation of Ser. No. 192,952, Feb. 7, 1994, abandoned, which is a continuation of Ser. No. 850,257, Mar. 12, 1992, abandoned, which is a continuation of Ser. No. 536,300, Jun. 11, 1990, abandoned.

[30] Foreign Application Priority Data

Jun. 15, 1989 [JP] Japan ..................... 1-153114

[51] Int. Cl.⁶ ..................................... H01L 41/08
[52] U.S. Cl. ........................... 318/116; 310/316
[58] Field of Search ..................... 310/316, 323; 318/116

[56] References Cited

U.S. PATENT DOCUMENTS

| | | | |
|---|---|---|---|
| 4,510,411 | 4/1985 | Hakamata et al. | 310/316 |
| 4,692,649 | 9/1987 | Izukawa et al. | 310/316 |
| 4,713,571 | 12/1987 | Suzuki et al. | 310/316 |
| 4,727,276 | 2/1988 | Izukawa et al. | 310/328 X |
| 4,743,788 | 5/1988 | Takagi et al. | 310/323 X |
| 4,749,896 | 6/1988 | Suzuki et al. | 310/316 |
| 4,794,294 | 12/1988 | Shimizu et al. | 310/316 |
| 4,812,699 | 3/1989 | Ogawa et al. | 310/316 |
| 4,879,528 | 11/1989 | Gotanda | 310/316 X |
| 4,914,337 | 4/1990 | Takagi | 310/316 |
| 4,926,084 | 5/1990 | Furutsu et al. | 310/316 |
| 4,952,834 | 8/1990 | Okada | 310/316 |
| 4,954,741 | 9/1990 | Furutsu et al. | 310/316 |
| 4,954,742 | 9/1990 | Izukawa et al. | 310/316 |
| 4,998,048 | 3/1991 | Furutsu | 318/116 |
| 5,136,215 | 8/1992 | Izukawa | 318/116 |
| 5,159,253 | 10/1992 | Shimizu et al. | 310/316 X |

FOREIGN PATENT DOCUMENTS

| | | | |
|---|---|---|---|
| 59-111609 | 7/1984 | Japan . | |
| 0058886 | 3/1987 | Japan | 310/323 |

Primary Examiner—Mark O. Budd
Attorney, Agent, or Firm—Shapiro and Shapiro

[57] ABSTRACT

A driving device for an ultrasonic wave motor comprises:
a stator member having an electrostrictive member and a resilient member, and adapted to generate travelling vibration wave in the resilient member by excitation with the electrostrictive member;
a moving member maintained in pressure contact with the stator member and driven by the travelling vibration wave;
a reference pulse oscillator circuit for generating reference pulses of a frequency determined corresponding to a required moving speed of the member;
an encoder for generating pulses relating to the amount of movement of the moving member;
a phase difference signal generating circuit for generating a phase difference signal corresponding to the phase difference between the reference pulses from the reference pulse oscillator circuit and the output pulses of the encoder; and
AC voltage forming circuit for forming AC voltage signals to be supplied to the electrostrictive member, based on the phase difference signal.

15 Claims, 9 Drawing Sheets

1

DRIVING DEVICE FOR ULTRASONIC WAVE MOTOR

This is a continuation of application Ser. No. 08/192,952 filed Feb. 7, 1994, now abandoned, which is a continuation of application Ser. No. 07/850,257 filed Mar. 12, 1992 (abandoned), which is a continuation of application Ser. No. 07/536,300 filed Jun. 11, 1990 (abandoned).

BACKGROUND OF THE INVENTION

1. Field of the Invention

The present invention relates to an ultrasonic wave motors in which a moving member is driven by a travelling vibration wave generated in a resilient member by a piezoelectric member.

2. Related Background Art

As disclosed in the U.S. Pat. No. 4,510,411, ultrasonic wave motor utilizing a travelling vibration wave generates a travelling vibration wave in a resilient member by applying an AC voltage to a piezoelectric member attached to the resilient member, thereby causing bending vibration in the piezoelectric member, and drives a rotor by maintaining the rotor in pressure contact with the resilient member.

The driving speed of such ultrasonic wave motor has been conventionally controlled by the frequency of the applied AC voltage in such a manner that the output voltage from a monitor electrode provided on the piezoelectric member remains at a predetermined level, or in such a manner that the phase difference between the output of the monitor electrode and the applied AC voltage becomes constant.

However, such frequency control to obtain constant monitor voltage or phase difference is sometimes still unable to provide desired speed, due to change in load, fluctuation in the ambient conditions or fluctuation in the pressure mentioned above.

In the field of DC motors, there is already well known control by a phase locked loop (PLL) for obtaining a desired speed in a stable manner. However, since the driving mechanism of the ultrasonic wave motor is different from that of the DC motor, the PLL circuit for a DC motor cannot be immediately applied to the ultrasonic wave motor.

SUMMARY OF THE INVENTION

An object of the present invention is to realize a speed control circuit using a phase locked loop method suitable for the ultrasonic wave motor, thereby providing a driving device capable of stabilizing the drive speed of the ultrasonic wave motor, without being influenced for example by the ambient conditions.

The above-mentioned object can be attained according to the present invention, by a driving device which is provided, as shown in FIG. 1 representing an embodiment of the present invention, with a reference pulse oscillator means 1 for generating reference pulses of a frequency corresponding to the speed of an ultrasonic wave motor 8, an encoder 9 for generating pulses in proportion to the amount of movement of a moving member, phase difference signal generating means 2 for generating a signal corresponding to the phase difference between the reference pulses from said reference pulse oscillator means 1 and the output pulses of the encoder 9, an integrator means 3 for integrating said phase difference signal, pulse generator means 4 for generating a pulse signal of a frequency corresponding to the output signal of said integrator means 3 within a range between an upper limit frequency and a lower limit frequency which are specific to the ultrasonic wave motor 8, and AC voltage signal forming means 5, 6a, 6b for forming an AC voltage signal in response to said pulse signal.

In the above-explained circuit, pulses proportional to the speed of the moving member are generated by the encoder 9, then there is obtained a signal corresponding to the phase difference between the reference pulses and the output pulses of the encoder, and the phase difference signal is integrated. Then pulses of a frequency corresponding the thus integrated signal are formed, and an AC voltage signal of the frequency is applied to the ultrasonic wave motor. Consequently the ultrasonic wave motor is driven at a predetermined speed, even in the presence of changes in driving conditions such as ambient conditions or pressure.

DESCRIPTION OF THE PREFERRED EMBODIMENTS

1st Embodiment

Figure 1:
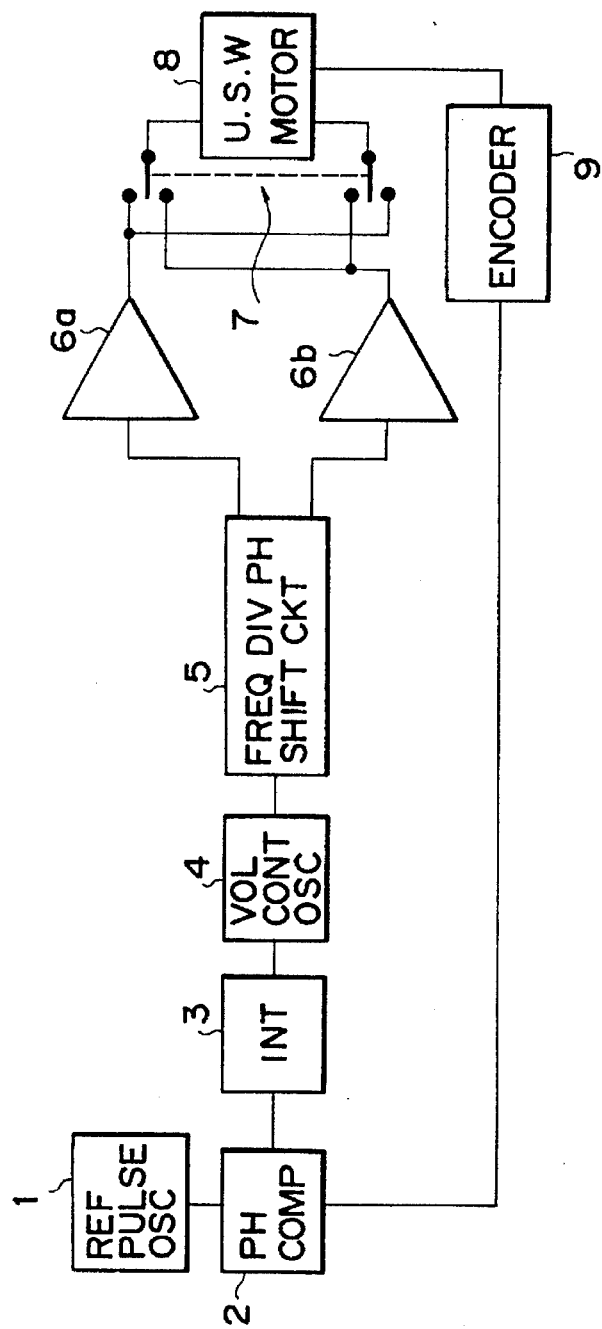
FIG. 1 is a block diagram of an embodiment of the driving device for an ultrasonic wave motor of the present invention.
Figure 2B:
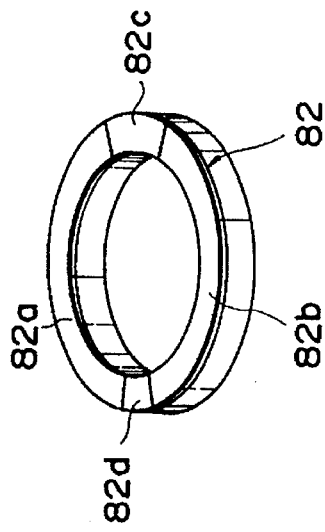
FIGS. 2A and 2B are respectively a cross-sectional view and a perspective view schematically showing the structure of an ultrasonic wave motor.
Figure 2A:
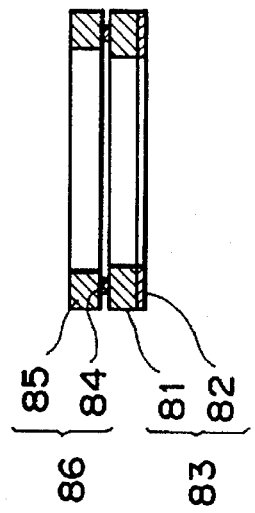

FIG. 1 is a block diagram of an embodiment of the present invention, FIG. 2A is a cross-sectional view schematically showing the structure of an ultrasonic wave motor, and FIG. 2B is a perspective view of a vibration member composed of a piezoelectric member and a resilient member.

At first the structure of the ultrasonic wave motor will be explained with reference to FIGS. 2A and 2B. A vibration member 83 is composed of a resilient member 81 and a piezoelectric member 82 adhered on a face thereof. A rotor 85 is maintained in pressure contact, across a slider 84, on the other face of the piezoelectric member 82, and the slider 84 and rotor 85 constitute a rotating member 86.

The piezoelectric member 82 is provided, on the surface thereof as shown in FIG. 2B, with four electrodes 82a, 82b, 82c, 82d, of which the electrodes 82a and 82b receive AC voltages with a mutual phase difference of $\pi/2$, while the electrode 82c is grounded. The electrode 82d is used for obtaining a monitor signal. The structure and function of these components will not be explained further, as they are already known, for example in the U.S. Pat. No. 4,510,411.

Figure 3:
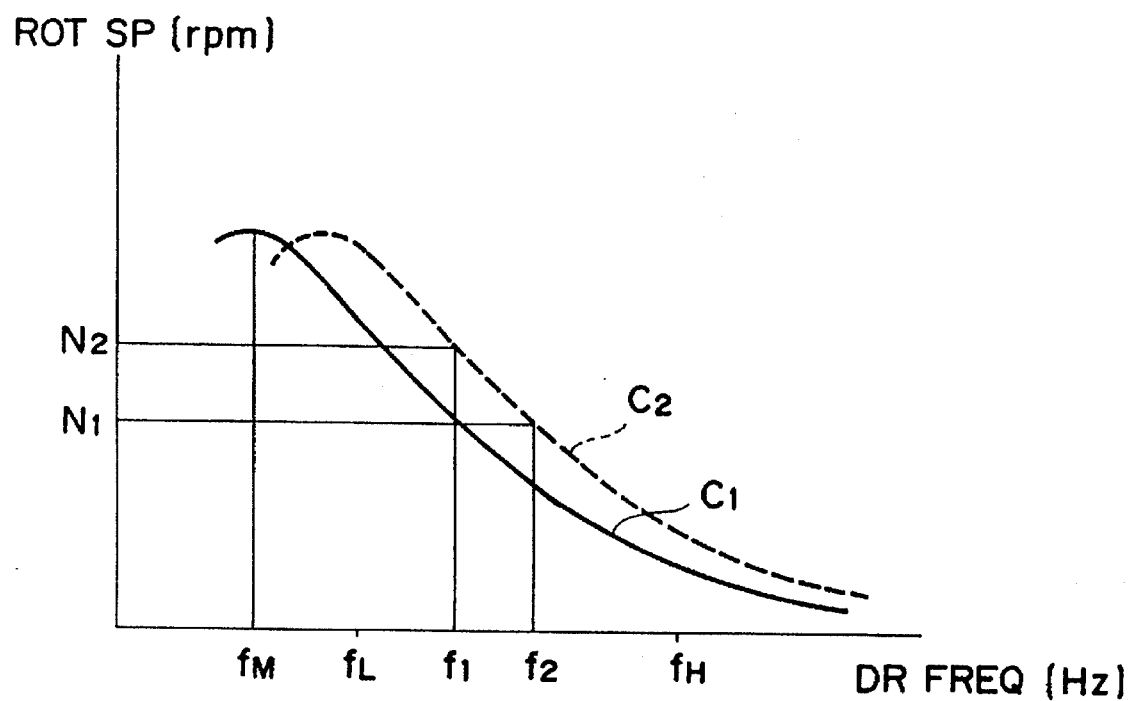
FIG. 3 is a chart showing the relation between drive frequency and drive speed of an ultrasonic wave motor.

Such ultrasonic wave motor has frequency-speed characteristics as shown by a solid line C1 or a broken line C2 in FIG. 3. Thus, when the driving frequency is higher than the resonance frequency $f_M$, the speed increases as the driving frequency decreases. On the other hand, when the driving frequency is lower than the resonance frequency $f_M$, the speed decreases as the driving frequency decreases. In general, the speed control is considered possible between a maximum frequency $f_H$ and a minimum frequency $f_L$ which are higher than the resonance frequency $f_M$. The lower limit frequency $f_L$ of the oscillation band of the voltage-controlled oscillator 4 shown in FIG. 1 is so selected as to satisfy a condition $f_L > f_M$ even when the resonance frequency $f_M$ varies for example by change in the load, fluctuation in the ambient conditions or change in the pressure. The maximum frequency $f_H$ corresponds to the lowest speed of the ultrasonic wave motor, and is so selected as to provide a speed sufficiently lower than the desired speed. Also the minimum frequency $f_L$ corresponds to the highest speed of the ultrasonic wave motor, and is so selected as to be higher than the resonance frequency even in the presence of a fluctuation in the load in the course of rotation of the ultrasonic wave motor at the desired speed. The solid line C1 shows the frequency-speed characteristics of the ultrasonic wave motor 8 under a certain ambient condition (hereinafter called 1st driving condition), and the broken line C2 indicates the characteristics under a different ambient condition (hereinafter called 2nd driving condition).

Figure 4:
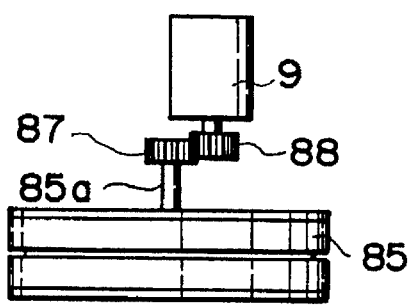
FIG. 4 is a schematic view showing the state of mounting of the encoder.

In the present embodiment, as shown in FIG. 4, a shaft 85a extending from the rotor 85 is coupled with a rotary encoder 9 through gears 87, 88, so that the rotary encoder 9 generates pulses of a frequency proportional to the speed of the rotor 85.

Now referring to FIG. 1, there are shown a reference pulse oscillator 1 for generating reference pulses of a frequency corresponding to a speed N1 to be explained later; a phase comparator 2 for comparing the phase of the output pulses from the encoder 9 with that of the reference pulses and generating a signal corresponding to the phase difference therebetween; an integrator 3, called a loop filter, for integrating the output signal of the phase comparator 2; a voltage-controlled oscillator (VCO) 4 for generating pulses of a frequency corresponding to the output voltage of integrator 3; a frequency-dividing phase-shifting circuit 5 for dividing the frequency of pulses from the VCO 4 and generating signals of a mutual phase difference of π/2; known power amplifiers 6a, 6b for amplifying the output signals of the frequency-dividing phase-shifting circuit 5 for supply of AC to the electrodes 82a, 82b of the piezoelectric member 82 of the ultrasonic wave motor 8; and switches 7 for controlling the input signals to the ultrasonic wave motor 8, thereby switching the rotating direction thereof, or stopping the motor in the open state.

Figure 5:
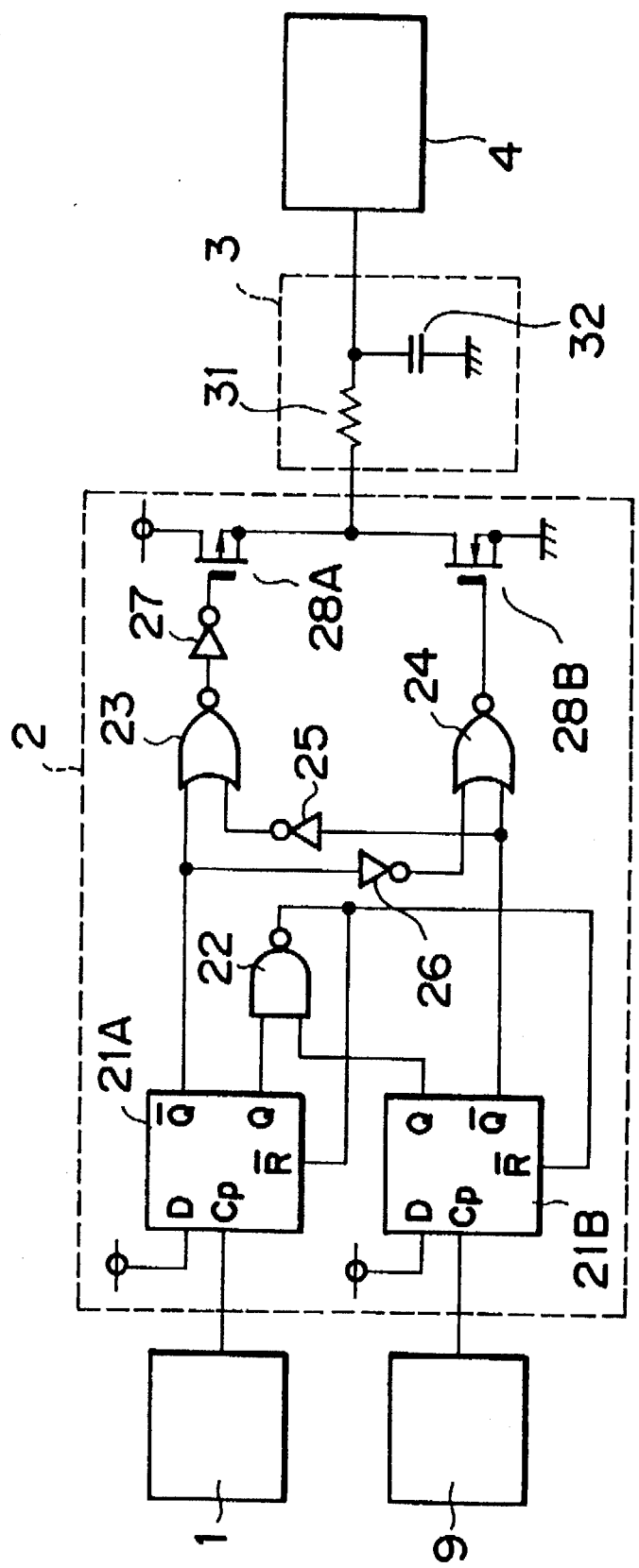
FIG. 5 is a circuit diagram of a phase comparator and a loop filter.

The details of the phase comparator 2 and the integrator 3 are shown in FIG. 5.

The phase comparator 2 is composed of JK-flip-flops 21A, 21B respectively receiving pulses from the encoder 9 and the reference pulse oscillator 1; a NAND gate 22; NOR gates 23, 24; inverters 25–27; and MOSFET's 28A, 28B, and provides a complementary output. It is of a known structure called phase-frequency comparator, and will not therefore be explained further. The integrator 3 is composed of a resistor 31 and a capacitor 32, constituting a lag filter.

Now the functions of the phase comparator 2 and the integrator 3 will be explained with reference to FIG. 6.

Figure 6:
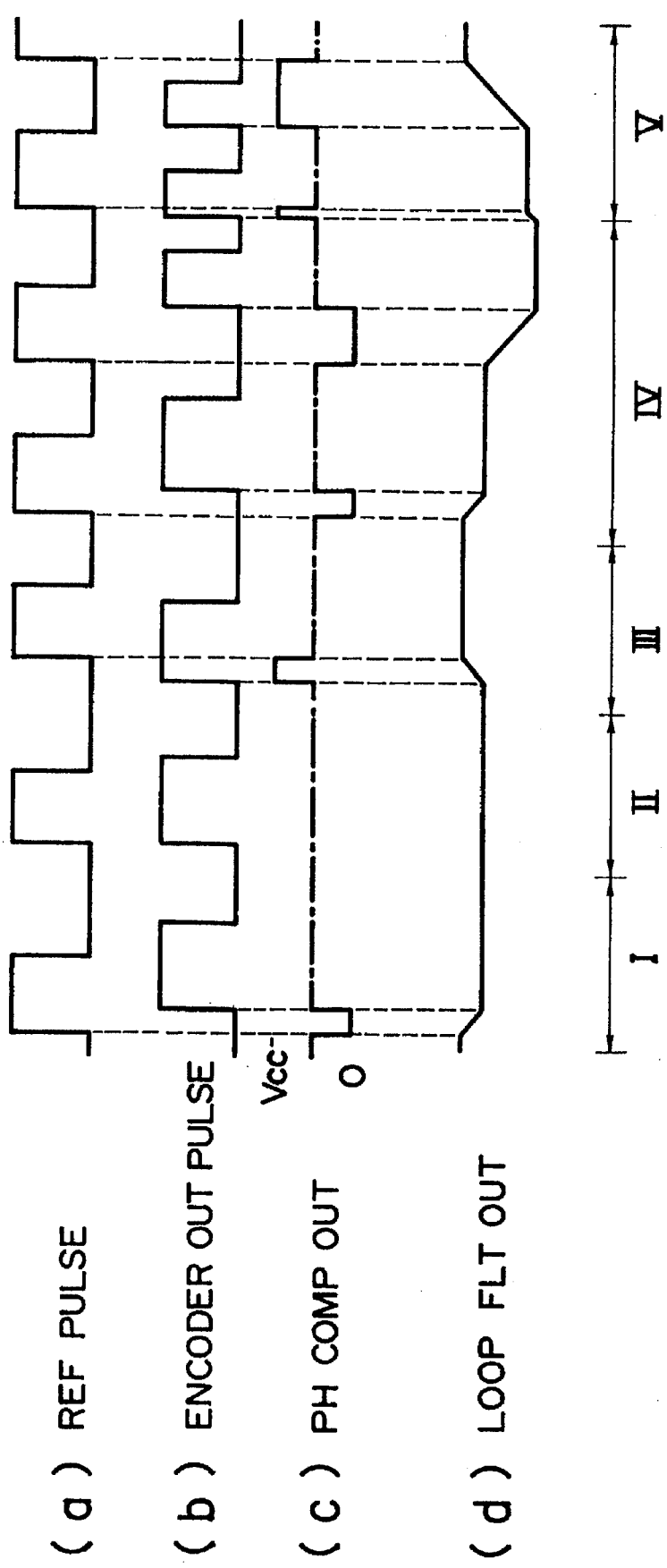
FIG. 6 is a timing chart of various input and output circuits in the circuit shown in FIG. 5.

In FIG. 6, (a) shows the reference pulses from the reference pulse oscillator 1, (b) output signal of the encoder 9, (c) output signal of the phase comparator 2, and (d) output signal of the loop filter 3.

When the phase of the encoder output pulses is delayed from that of the reference pulses as shown in the section I, the MOSFET 28B is turned on from the upshift of the reference pulse to that of the encoder output pulse, namely for a period corresponding to the delay in phase as shown in (c), whereby the output of the phase comparator 2 becomes zero. At the upshift of the encoder output pulse, the MOSFET's 28A, 28B are turned off, whereby the output of the phase comparator 2 assumes a high-impedance state as indicated by a chain line in (c). As shown in (d), the output of the loop filter 3 descends after the MOSFET 28B is turned on, but is retained when the output of the phase comparator 2 assumes the high impedance state by the turning-off of the MOSFET 28B.

In the section II, the reference pulses and the encoder output pulses are of a same phase, whereby the MOSFET's 28A, 28B are maintained off, and the output of the loop filter 3 remains constant as shown in (d).

In the section III, the reference pulses are delayed in phase with respect to the encoder output pulses, whereby the MOSFET 28A is turned on from the upshift of the encoder output pulse to the downshift of the reference pulse, and the phase comparator 2 releases a voltage Vcc as shown in (c). Consequently the output voltage of the loop filter 3 increases.

In the section IV, the frequency of the encoder output pulses is lower than that of the reference pulses, whereby the output of the loop filter 3 decreases.

In the section V, the frequency of the encoder output pulses is higher than that of the reference pulses, whereby the output of the loop filter 3 increases.

Thus the output of the loop filter 3 decreases when the reference pulses are advanced in phase or are of a higher frequency compared with the encoder output pulses, and vice versa. Also the output does not change if the reference pulses and the encoder output pulses are of a same phase and a same frequency.

Figure 7:
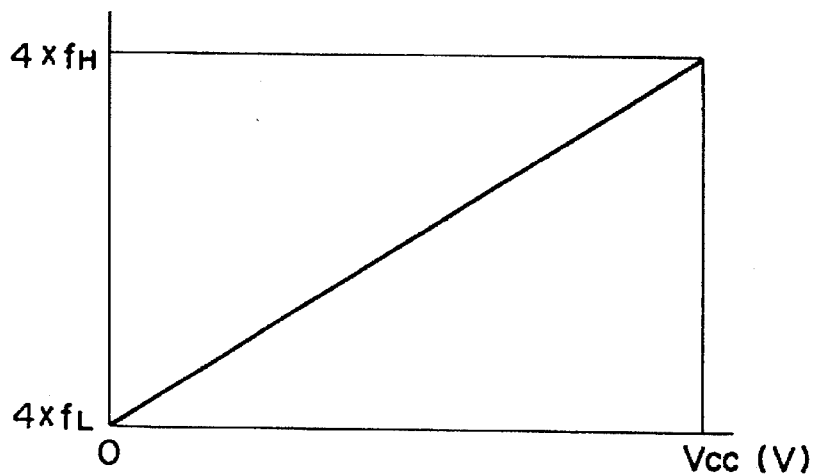
FIG. 7 is a chart showing the relation between the input voltage and the output frequency of a voltage-controlled oscillator.

FIG. 7 shows the relationship between the input voltage and the output frequency of the VCO 4, wherein the input voltage is the output voltage of the loop filter 3. A frequency $4 \times f_L$ is released in response to the minimum output voltage of 0 V from the loop filter 3, and a frequency $4 \times f_H$ is released in response to the maximum output voltage Vcc from the loop filter 3.

Figure 8:
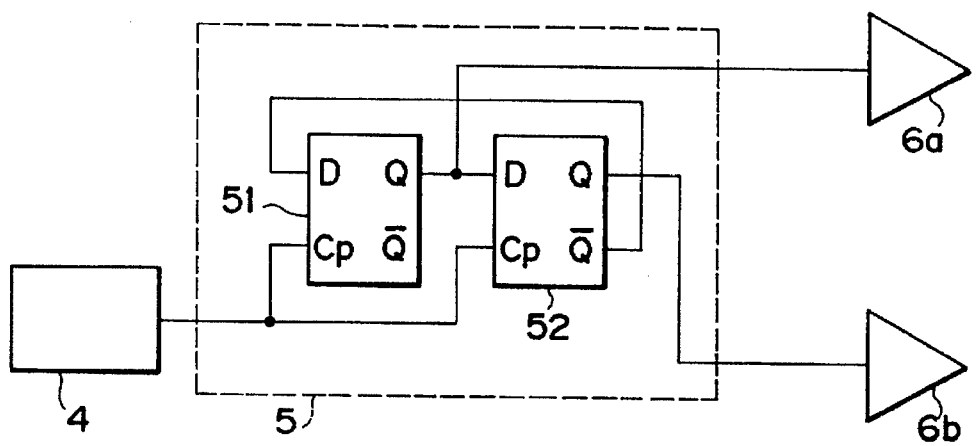
FIG. 8 is a circuit diagram of a frequency-dividing phase-shifting circuit.
Figure 9:
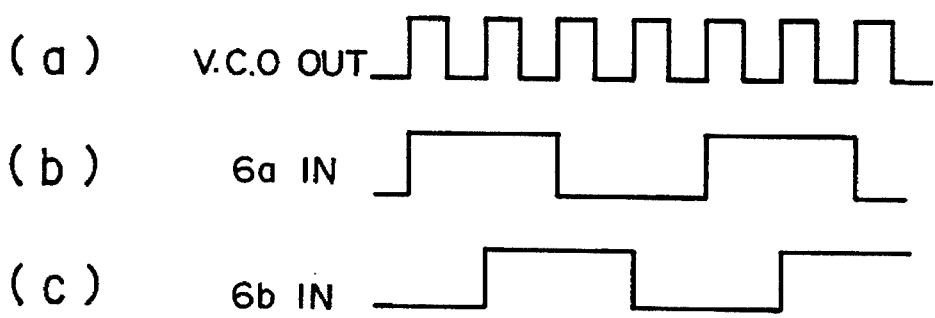
FIG. 9 is a timing chart of various signals therein.

The frequency-dividing phase-shifting circuit 5 is composed, as shown in FIG. 8, of two D-flip-flops 51, 52, and the set output terminal Q of the flip-flop 51 is connected to the data input terminal D of the flip-flop 52, while the inverted set output terminal $\overline{Q}$ is connected to the data input terminal D of the flip-flop 51. Consequently, as shown in FIG. 9, circuit 5 divides the output frequency of the VCO 4 by 4 and generates signals having a mutual phase difference of π/2.

In the following there will be explained the function of the driving device for an ultrasonic wave motor of the present invention.

Let us consider a state in which the ultrasonic wave motor 8 is driven with a speed N1 by the application of an AC voltage of a driving frequency f1 to the piezoelectric member of the motor under the 1st driving condition represented by the curve C1 in FIG. 3. If the driving condition changes to the 2nd one, the speed of the motor 8 changes to N2 defined by the curve C2.

The present invention is to effect PLL speed control in such case, thereby maintaining the ultrasonic wave motor 8 at the speed N1 even after the change from the 1st to the 2nd driving condition.

If the ultrasonic wave motor 8 and the encoder 9 rotate with a 1:1 speed ratio, the frequency of the encoder output pulses at the speed N1 of the motor 8 can be represented by:

$$FE \times \frac{N1}{60} \text{ (Hz)} \qquad (1)$$

wherein FE is the number of output pulses of the encoder 9 per turn thereof.

Thus the frequency of the reference pulses of the reference pulse oscillator 1 is selected at a value determined by (1).

When the switches 7 is in a neutral position shown in FIG. 1 and the ultrasonic wave motor 8 are stopped, the frequency of the output pulses of the encoder 9 is 0 Hz. In this state the phase comparator 2 receives the reference pulses, and the output voltage of the loop filter 3 decreases with time to reach 0 V after a predetermined time. Consequently the output of the VCO 4 becomes equal to $4 \times f_L$ as shown in FIG. 7. When the switches 7 are closed in either direction, the set output terminals Q of the flip-flops 51, 52 of the frequency-dividing phase-shifting circuit 5 release signals, as shown by (b) and (c) in FIG. 9, having a frequency equal to one-fourth that of the input signal from the VCO 4 and having a mutual phase difference of π/2. Consequently the ultrasonic wave motor 8 receives the AC voltage of a frequency $f_L$ and starts rotation toward the maximum speed.

In the course of gradual increase of speed of the motor 8, while the speed is lower than N1, the frequency of the encoder output pulses is lower than that of the reference pulses, whereby the phase comparator 2 decreases the output voltage of the loop filter 3 as explained above. Consequently the output voltage of the loop filter 3 becomes approximately zero, whereby the output frequency of the VCO 4 becomes equal to $4 \times f_L$ to apply the AC voltage of a frequency $f_L$, corresponding to the maximum speed, to the ultrasonic wave motor 8. Thus the speed of the motor 8 increases with time. When the speed exceeds N1, the frequency of the encoder output pulses becomes higher than that of the reference pulses, whereby the phase comparator 2 increases the output voltage of the loop filter 3 as explained above. Consequently the output frequency of the VCO 4 increases to elevate the driving frequency, thereby reducing the speed of the ultrasonic wave motor 8. Repetition of the above-explained cycles brings the driving frequency to $f_1$ providing the target speed N1. The rate of convergence to that frequency can be suitably regulated by the time constant of the loop filter.

Then, if the driving condition varies from the 1st to the 2nd one due to a fluctuation in the load or in the pressure, the frequency-speed characteristics of the ultrasonic wave motor 8 changes from C1 to C2 shown in FIG. 3, whereby the speed at the driving frequency $f_1$ increases toward N2 (>N1). Consequently the frequency of the encoder output pulses becomes larger than that of the reference pulses, whereby the phase comparator 2 elevates the output voltage of the loop filter 3. As the result the output frequency of the VCO 4 increases, and the driving frequency varies toward the maximum frequency $f_H$. Through this operation the speed of the motor 8 is lowered, and the driving frequency converges to $f_2$ providing the speed N1.

As explained in the foregoing, the PLL speed control circuit of the present invention maintains the speed of the ultrasonic wave motor 8 at a constant value, regardless of the change for example in the ambient condition or in the pressure.

In the above-explained embodiment, the reference pulse oscillator means is formed by the reference pulse oscillator 1, phase difference signal generating means by the phase comparator 2, integrating means by the loop filter 3, pulse generating means by the VCO 4, and AC voltage signal forming means by the frequency-dividing phase-shifting circuit 5 and power amplifiers 6a, 6b.

The loop filter 3 is composed of a lag filter in the foregoing explanation, but it may also be composed of a lag lead filter or an active filter. Also the phase comparator may be composed of a bi-directional shift register instead of JK-flip-flops. Also the encoder may be of any type or structure as long as it is capable of generating pulses corresponding to the speed of the moving member.

The VCO 4 employed in the above-explained embodiment is so designed to generate pulse signals of a frequency $4 \times f_L$ or $4 \times f_H$ respectively in response to the input voltage of 0 V or Vcc. If the VCO itself does not have such characteristics, there may be obtained oscillation with a range from $4 \times f_L$ to $4 \times f_H$ by a voltage-controlled oscillator circuit explained in the following.

Figure 10:
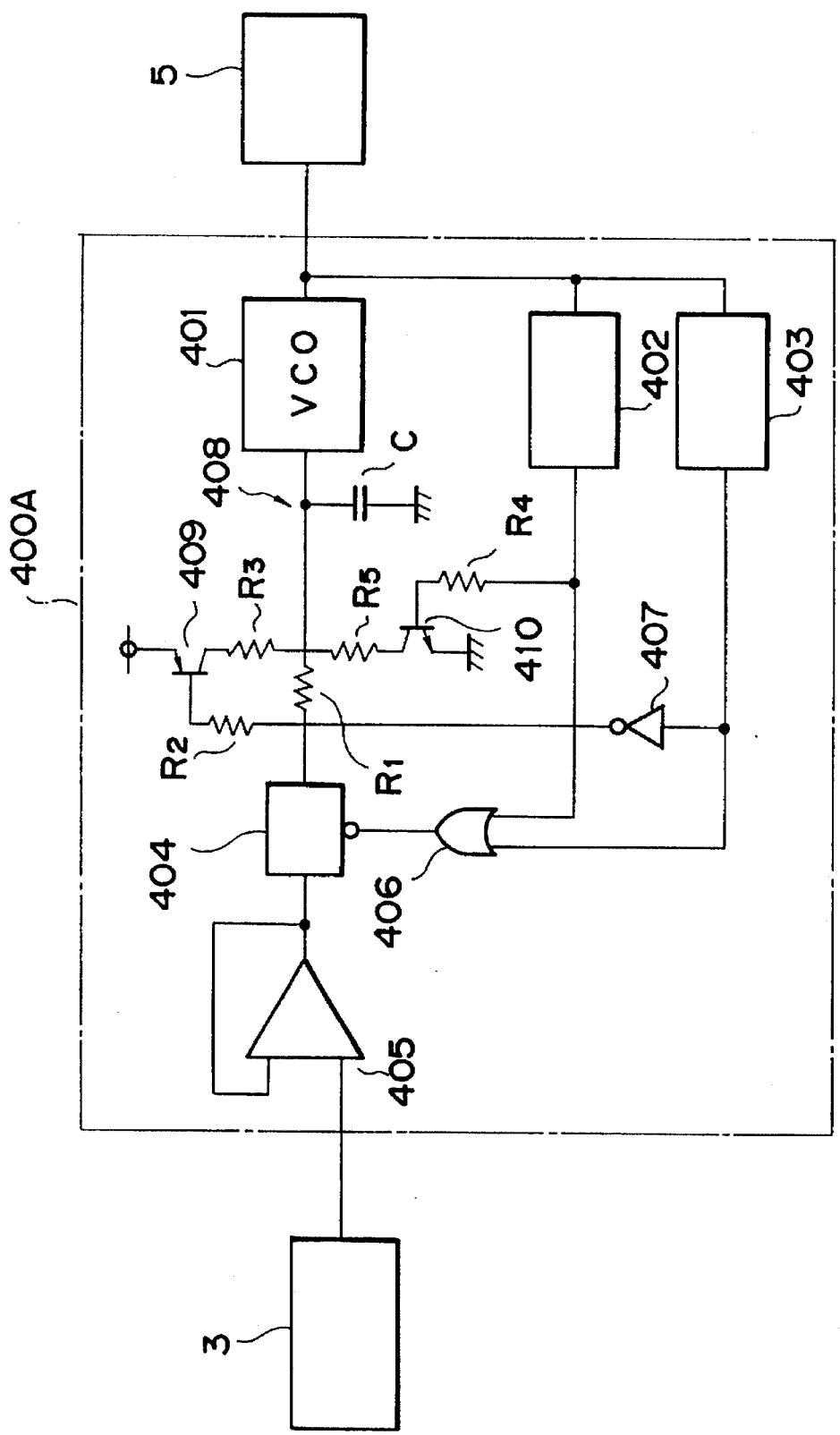
FIGS. 10 to 13 are diagrams showing examples of a voltage-controlled oscillating circuit, utilizing a voltage-controlled oscillator having a frequency region exceeding the range from the lowest driving frequency to the highest driving frequency of the ultrasonic wave motor.

[1] Method for controlling the output of loop filter 3:

(1) FIG. 10 illustrates an embodiment of the voltage-controlled oscillator circuit capable of defining the upper and lower limits of the oscillation frequency by controlling the output voltage of the loop filter 3, wherein a voltage-controlled oscillator circuit (pulse generating means) 400A is composed of a VCO 401 and a peripheral circuit for limiting the oscillation frequency thereof. The VCO 401 itself generates pulses of a frequency lower than $4 \times f_L$ in response to an input voltage of 0 V, and pulses of a frequency higher than $4 \times f_H$ in response to an input voltage Vcc. A high frequency discriminator 402 releases a high-level signal when the output frequency of the VCO 401 is higher than $4 \times f_H$, or a low-level signal when said the output frequency is equal to or lower than $4 \times f_H$. A low frequency discriminator 403 releases a high-level signal or a low-level signal respectively when the output of the VCO 401 is of a lower frequency than $4 \times f_L$, or equal to or higher than $4 \times f_L$. An analog switch 404 is closed when the output of the VCO 401 is within a frequency range of $4 \times f_L$ to $4 \times f_H$ or otherwise opened, according to the output signals of the high-frequency discriminator 402 and of the low-frequency discriminator 403. There are also shown a known voltage follower 405, an OR gate 406 for forming the logic sum of the output signals of the frequency discriminators 402, 403 for supply to the control terminal of the analog switch 404, an inverter 407 for inverting the output of the low-frequency discriminator 403, a low-pass filter 408 composed of a resistor R1 and a capacitor C and having a time constant sufficiently smaller than that of the loop filter 3, a transistor 409 to be turned on by the output signal of the low-frequency discriminator 403 through the inverter 407 when the VCO 401 releases a frequency lower than $4 \times f_L$, a transistor 410 to be turned on by the output signal of the high-frequency discriminator 402 when the VCO 401 releases a frequency higher than $4 \times f_H$, and resistors R2–R5.

In the following there will be explained the function of the voltage-controlled oscillator circuit 400A, consisting of the VCO 401 and the peripheral circuits.

When the VCO 401 oscillates within the frequency range of $4 \times f_L$ to $4 \times f_H$ in the course of operation of the ultrasonic wave motor 8, the analog switch 404 is closed and the transistors 409, 410 are both turned off. Thus the integrated signal from the loop filter 3, transmitted through the voltage follower 405, is supplied to the VCO 401 through the low-pass filter 408, whereby the VCO 401 releases pulses of a frequency corresponding to the input voltage.

If the oscillation frequency of the VCO 401 becomes higher than $4 \times f_H$ due to the increase of the output voltage of the loop filter 3 in this state, the high-frequency discriminator 402 releases a high-level output to open the analog switch 404, thereby intercepting the output signal of the voltage follower 405 and turning on the transistor 410. Since the transistor 409 is turned off, the capacitor C is discharged through the resistor R5, thereby reducing the input voltage to the VCO 401 and reducing the oscillation frequency thereof. When the output frequency of the VCO 401 becomes lower than $4 \times f_H$, the output of the high-frequency discriminator 402 is inverted to the low level state thereby closing the analog switch 404 and turning off the transistor 410. Thus the capacitor C is charged, through the resistor R1, by the output voltage of the voltage follower 405. In response the oscillation frequency of the VCO 401 starts to elevate again, and, when it exceeds $4 \times f_H$ again, it is controlled to $4 \times f_H$ or below as explained above.

On the other hand, if the oscillation frequency of the VCO 401 is lower than $4 \times f_L$ due to the low output voltage of the loop filter 3, the low-frequency discriminator 403 releases a high-level output to open the analog switch 404 and to turn on the transistor 409. Since the transistor 410 is turned off, the capacitor C is charged through the resistor R3, thereby elevating the input voltage to the VCO 401 and increasing the oscillation frequency thereof. When the oscillation frequency becomes equal to or higher than $4 \times f_L$, the output of the low-frequency discriminator 403 is shifted to the low level state, thereby closing the analog switch 404 and turning off the transistor 409. Thus the capacitor C is charged by the output voltage of the voltage follower 405, whereby the input voltage of the the VCO 401 continues to rise, and the oscillation frequency thereof is maintained at $4 \times f_L$ or higher.

The voltage-controlled oscillation circuit 400A including the peripheral circuit explained above is thus capable of maintaining the oscillation frequency within a range from $4 \times f_L$ to $4 \times f_H$, even utilizing a VCO of which the oscillation frequency range does not match the above-mentioned range.

(2) In the above-explained embodiment shown in FIG. 10, if the switch 7 is closed simultaneously with the activation of the driving circuit for the ultrasonic wave motor 8, the oscillation frequency of the VCO 401 at the starting of the motor is $4 \times f_L$, so that the motor 8 is started with the frequency corresponding to the maximum speed and is gradually controlled to the target speed. On the other hand, for starting the motor with the minimum speed, there can be employed a voltage-controlled oscillator circuit 400B shown in FIG. 11, in which the same components as those in FIG. 10 are represented by the same numbers. In the following there will principally be explained the differences from the foregoing embodiment.

A switch 411 is linked with the switches 7 shown in FIG. 1, and is in a neutral position when the ultrasonic wave motor 8 is stopped. A multiplexer 412 selects the output of the inverter 407 or that of the high-frequency discriminator 402, for supply to the base of the transistor 409. When switch 411 is in the neutral position, a high-level signal is supplied through a resistor R6 to the control terminal of said multiplexer 412, which in response selects the output of the high-frequency discriminator 402. On the other hand, when the switch 411 is closed, a low-level signal is supplied to the control terminal of the multiplexer 412, which in response selects the output signal of the inverter 407. A 3-input OR gate 413 receives the outputs of the switch 411 and the high- and low-frequency discriminators 402, 403, and sends the output to the control terminal of the analog switch 404.

When the ultrasonic wave motor 8 is stopped by the open state of the switches 7, a high-level signal from the switch 411 is supplied, through the OR gate 413, to the control terminal of the analog switch 404, which is in response maintained open. In response to the high-level signal, the multiplexer 412 selects the high-frequency discriminator 402. In this state, if the oscillation frequency of the VCO 401 is higher than $4 \times f_H$, high-frequency discriminator 402 releases a high-level signal to turn off the transistor 409 and turn on the transistor 410. Thus the capacitor C is discharged through the resistor R5, whereby the input voltage of the VCO 401 decreases and the oscillation frequency thereof also decreases. When it becomes equal to or lower than $4 \times f_H$, the output of the high-frequency discriminator 402 is shifted to the low-level state to turn off the transistor 410 and to turn on the transistor 409, whereby the capacitor C is charged through the resistor R3. Thus the input voltage to the VCO 401 is elevated and the oscillation frequency thereof increases. When it again exceeds $4 \times f_H$, the output of the frequency discriminator 402 is inverted and the oscillation frequency decreases. By the repetition of the above-explained functions, the VCO 401 oscillates at $4 \times f_H$ when the ultrasonic wave motor 8 is stopped.

When the switch 7 are closed in either direction in this state, the signal from the switch 411 to the multiplexer 412 is shifted to the low level, whereby the multiplexer 412 selects the output of the low-frequency discriminator 403 supplied through the inverter 407. Also since the input from the switch 411 to the 3-input OR gate 413 is shifted to the low level, an operation similar to that explained in relation to FIG. 10 is conducted when either one of the outputs of the frequency discriminators 402, 403 is shifted to the high-level state. Thus the oscillation frequency of the VCO 401 is controlled to a value corresponding to a predetermined speed, within a frequency range of $4 \times f_L$ to $4 \times f_H$.

Figure 12:
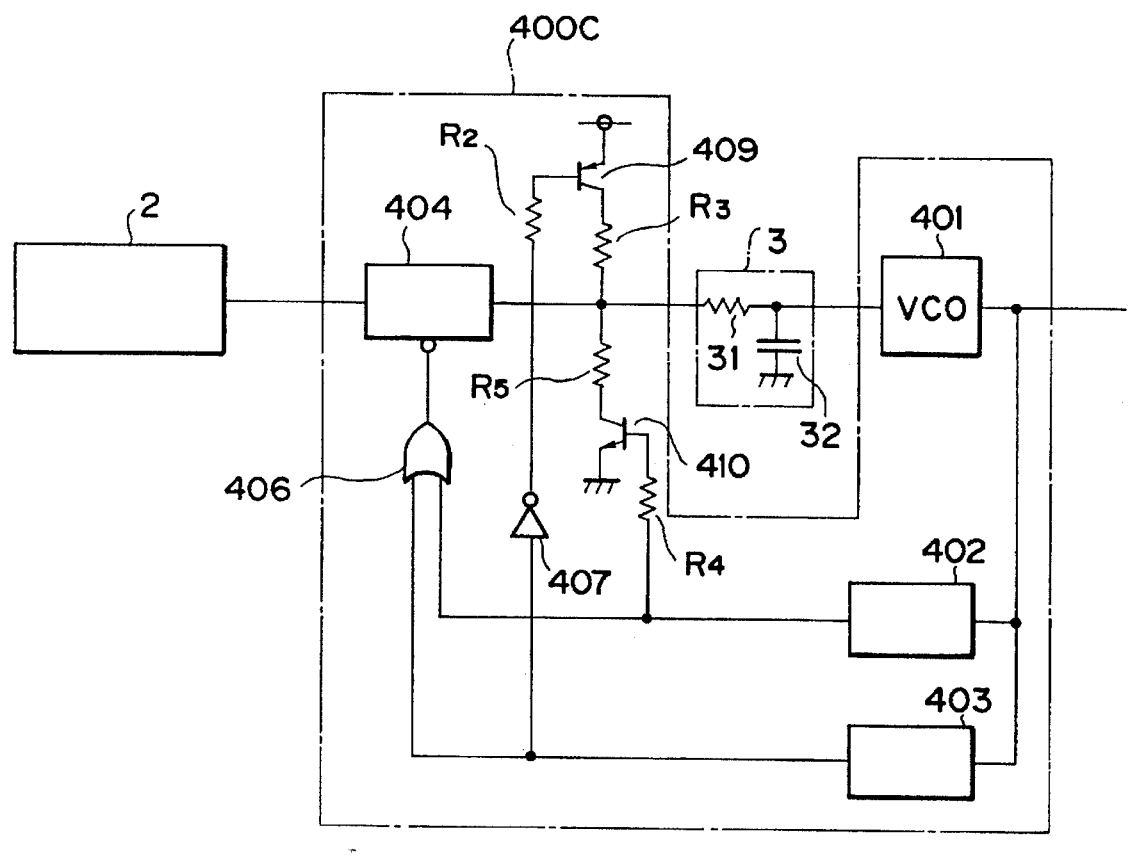

[2] Method for controlling the input voltage to the loop filter 3;

(1) FIG. 12 is an embodiment of the voltage-controlled oscillator circuit 400C for controlling the input voltage of the loop filter 3, corresponding to FIG. 10. In FIG. 12, the same components as those in FIG. 10 are represented by the same numbers.

The circuit 400C is formed by inserting the components of the circuit shown in FIG. 10, except for the voltage follower 405 and the low-pass filter 408, in the input side of the loop filter 3 as shown in FIG. 12.

When the oscillation frequency of the VCO 401 exceeds $4 \times f_H$, the analog switch 404 is opened and the transistor 410 is turned on, whereby a capacitor 32 is discharged through the resistor R5. Thus the input voltage to the VCO 401 is lowered to reduce the oscillation frequency thereof. When the oscillation frequency becomes equal to or lower than $4 \times f_H$, the analog switch 404 is closed and the transistor 410 is turned off, whereby the capacitor 32 is charged by the output voltage of the phase comparator 2 to elevate the input voltage to the VCO 401 again, thereby increasing the oscillation frequency thereof. By repetition of the above-explained operations, the oscillation frequency of the VCO 401 is controlled to $4 \times f_H$.

When the VCO 401 oscillates at a frequency equal to or lower than $4 \times f_L$, the components are similarly controlled by the output signal of the low-frequency discriminator 403, whereby the oscillation frequency of the VCO 401 is controlled to $4 \times f_L$.

Figure 11:
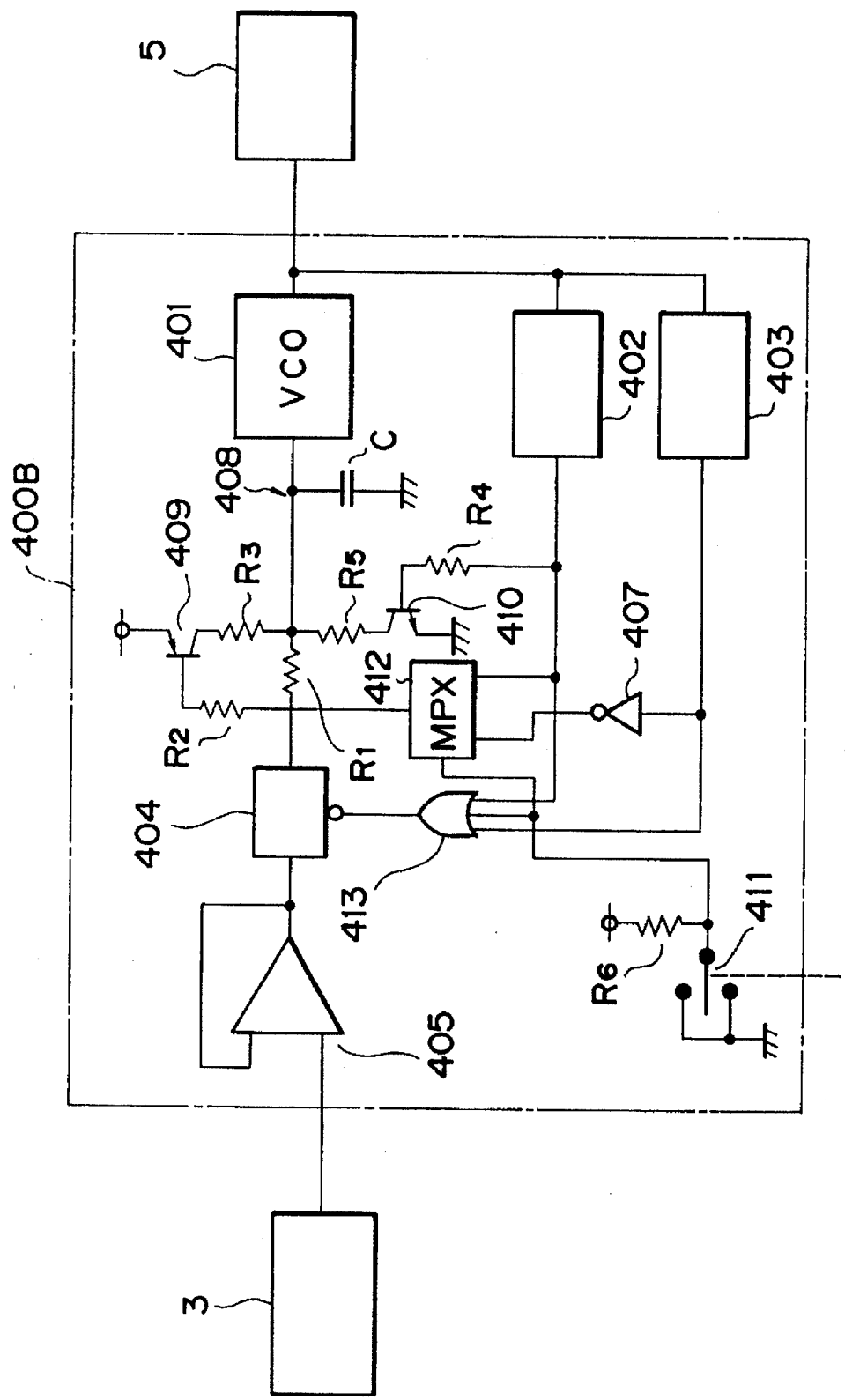
Figure 13:
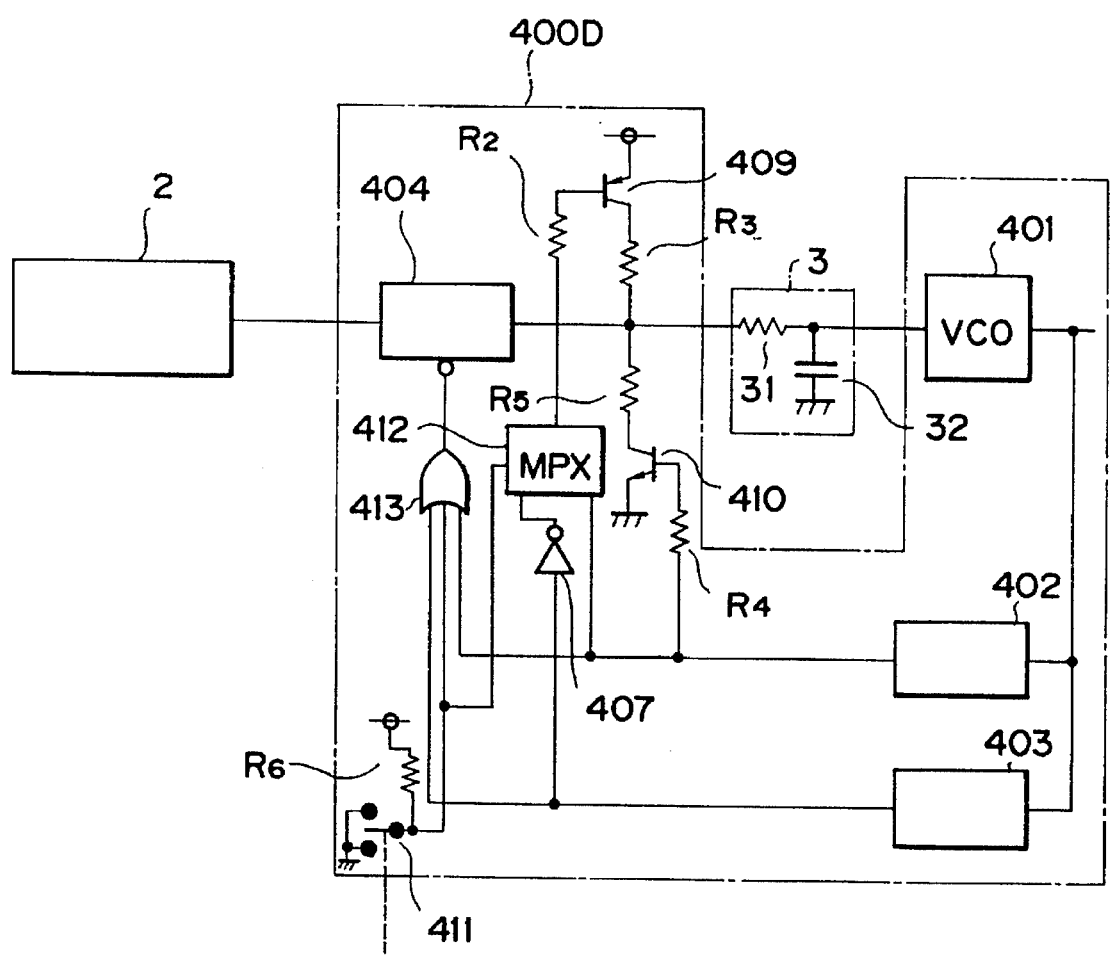

(2) FIG. 13 shows another embodiment corresponding to FIG. 11, wherein the same components as those in FIG. 11 are represented by the same numbers, and different points only will be explained in the following.

The voltage-controlled oscillator circuit 400D is formed by inserting the components shown in FIG. 11, except for the voltage follower 405 and the low-pass filter 408, into the input side of the loop filter 3, as shown in FIG. 13.

When the switch 7 are off, the switch 411 releases a high-level signal whereby the analog switch 404 is opened and the multiplexer 412 selects the high-frequency discriminator 402. If the output of the frequency discriminator 402 is at the low level state, the transistor 409 is turned on while the transistor 410 is turned off. Consequently the capacitor 32 of the loop filter 3 is charged through the resistor R3, thus elevating the input voltage to the VCO 401. When the oscillation frequency thereof exceeds $4 \times f_H$, the transistor 409 is turned off while the transistor 410 is turned on to discharge the capacitor 32 through the resistor R5, thereby reducing the input voltage to the VCO 401. When the oscillation frequency becomes equal to or less than $4 \times f_H$, the capacitor 32 is charged again to elevate the input voltage of the VCO 401, thereby increasing the oscillation frequency thereof. By the repetition of such operations, the oscillation frequency of the VCO 401 is controlled to $4 \times f_H$ when the ultrasonic wave motor 8 is stopped, and when the switch 7 are closed, the motor 8 is started with the minimum speed.

The present invention is naturally applicable to the linear ultrasonic wave motor.

As explained in the foregoing, the present invention controls the ultrasonic wave motor with a phase-locked loop speed control circuit, to obtain a predetermined speed in stable manner even in the presence of fluctuation in the ambient condition or in the pressure.

What is claimed is:

1. A driving device for an ultrasonic vibration motor, comprising:
   a vibration element having an electro-mechanical converting element and an elastic member, and adapted to generate vibration in said elastic member by excitation with said electro-mechanical converting element;
   a relative moving element maintained in pressure contact with said vibration element and driven by said vibration;
   a reference pulse oscillator circuit which generates reference pulses of a frequency determined corresponding to a requested speed of said relative moving element;
   an encoder which generates output pulses in response to an amount of movement of said relative moving element;
   a phase difference signal generating circuit which compares a phase of the output pulses generated by said encoder with a phase of the reference pulses generated by said reference pulse oscillator circuit to generate a phase difference signal corresponding to a phase difference between said reference pulses and said output pulses; and
   a control circuit which controls frequency of voltage signals to be applied to said electro-mechanical converting element based on said phase difference signal.

2. A driving device for an ultrasonic vibration motor according to claim 1, wherein said reference pulse oscillator circuit, said encoder, said phase difference signal generating circuit, and said control circuit constitute a phase locked loop.

3. A driving device for an ultrasonic vibration motor according to claim 1, wherein said phase difference signal generating circuit comprises an integrator which integrates said phase difference signal, and a pulse generating circuit which generates a pulse signal in response to an output from said integrator.

4. A driving device for an ultrasonic vibration motor according to claim 3, wherein said pulse generating circuit is adapted to generate a pulse signal of frequency between an upper limit frequency and a lower limit frequency specific to said vibration motor.

5. A driving device for an ultrasonic vibration motor according to claim 4, wherein said pulse generating circuit is adapted to generate the pulse signal of said upper limit frequency at a start of said vibration motor.

6. A driving device for an ultrasonic vibration motor according to claim 4, wherein said pulse generating circuit is adapted to generate the pulse signal of said lower limit frequency at a start of said vibration motor.

7. A driving device for an ultrasonic vibration motor according to claim 1, wherein said relative moving element of the vibration motor is a rotor, and said encoder is a rotary encoder.

8. A driving device for an ultrasonic vibration motor, comprising:
   a vibration element having an electro-mechanical converting element and an elastic member, and adapted to generate vibration in said elastic member by excitation with said electro-mechanical converting element;
   a relative moving element maintained in pressure contact with said vibration element and driven by said vibration;
   an encoder which generates output pulses in response to an amount of movement of said relative moving element;
   circuitry which generates reference pulses of a frequency determined corresponding to a requested speed of said relative moving element, and which compares a phase of the output pulses generated by said encoder with a phase of said reference pulses to generate a phase difference signal corresponding to a difference in frequency and in phase between the reference pulses and the output pulses, and which controls a frequency of AC voltage signals to be applied to said electro-mechanical converting element based on said phase difference signal.

9. A driving device for an ultrasonic vibration motor according to claim 8, wherein said circuitry which generates said phase difference signal comprises an integrator which integrates said phase difference signal, and a pulse generating circuit which generates a pulse signal in response to an output from said integrator.

10. A driving device for an ultrasonic vibration motor according to claim 9, wherein said pulse generating circuit is adapted to generate the pulse signal of a frequency between an upper limit and a lower limit frequency specific to said vibration motor.

11. A driving device for an ultrasonic vibration motor according to claim 10, wherein said pulse generating circuit is adapted to generate the pulse signal of said upper limit frequency at a start of said vibration motor.

12. A driving device for an ultrasonic vibration motor according to claim 10, wherein said pulse generating circuit is adapted to generate the pulse signal of said lower limit frequency at a start of said vibration motor.

13. A driving device for an ultrasonic vibration motor according to claim 8, wherein said relative moving element of the vibration motor is a rotor, and said encoder is a rotary encoder.

14. A driving device for an ultrasonic vibration actuator, comprising:
   a stator member having an electro-mechanical converting element and an elastic member, and adapted to generate vibration on a surface of said elastic member by excitation with said electro-mechanical converting element;

a relative moving element maintained in pressure contact with said stator member and moved by said vibration;

a reference pulse oscillator circuit which generates a sequence of reference pulses of a frequency determined corresponding to a requested speed of said relative moving element;

an encoder which generates a sequence of output pulses in response to an amount of movement of said relative moving element;

a phase difference signal generating circuit which compares a phase of the output pulses generated by said encoder with a phase of the reference pulses generated by said reference pulse oscillator circuit to generate a phase difference signal corresponding to a phase difference between said reference pulses and said output pulses; and a control circuit which controls a frequency of voltage signals to be applied to said electro-mechanical converting element based on said phase difference signal.

15. A driving device for an ultrasonic vibration actuator, comprising:

a stator member having an electro-mechanical converting element and an elastic member, and adapted to generate vibration on a surface of said elastic member by excitation with said electro-mechanical converting element;

a relative moving element maintained in pressure contact with said stator member and driven by said vibration;

an encoder which generates a sequence of output pulses in response to an amount of movement of said relative moving element; and circuitry which generates a sequence of reference pulses of a frequency determined corresponding to a requested speed of said relative moving element, and which compares a phase of the output pulses generated by said encoder with a phase of said reference pulses to generate a phase difference signal corresponding to a difference in frequency and in phase between the reference pulses and the output pulses, and which controls a frequency of voltage signals to be applied to said electro-mechanical converting element based on said phase difference signal.

* * * * *